United States Patent
Qi et al.

(10) Patent No.: US 9,907,037 B2
(45) Date of Patent: Feb. 27, 2018

(54) METHODS, WIRELESS COMMUNICATION STATIONS, AND SYSTEM FOR SYNCHRONIZING DEVICES AND NEIGHBOR AREA NETWORKING (NAN) CONFIGURATION

(71) Applicant: Intel IP Corporation, Santa Clara, CA (US)

(72) Inventors: Emily H. Qi, Portland, OR (US); Minyoung Park, Portland, OR (US); Oren Kaidar, Binyamina (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/076,494

(22) Filed: Mar. 21, 2016

(65) Prior Publication Data
US 2016/0205642 A1    Jul. 14, 2016

Related U.S. Application Data

(62) Division of application No. 14/124,798, filed as application No. PCT/US2013/047966 on Jun. 26, 2013, now Pat. No. 9,295,015.
(Continued)

(51) Int. Cl.
| | |
|---|---|
| *H04W 56/00* | (2009.01) |
| *H04W 24/02* | (2009.01) |
| *H04W 84/12* | (2009.01) |

(52) U.S. Cl.
CPC .......... *H04W 56/00* (2013.01); *H04W 24/02* (2013.01); *H04W 84/12* (2013.01)

(58) Field of Classification Search
CPC ...... H04W 56/00; H04W 24/02; H04W 84/12
See application file for complete search history.

(56) References Cited

U.S. PATENT DOCUMENTS

| | | |
|---|---|---|
| 6,915,130 B1 | 7/2005 | Chapman |
| 8,570,898 B1 | 10/2013 | Kopikare et al. |

(Continued)

FOREIGN PATENT DOCUMENTS

| | | |
|---|---|---|
| CN | 1698317 A | 11/2005 |
| CN | 101273654 A | 9/2008 |

(Continued)

OTHER PUBLICATIONS

"U.S. Appl. No. 14/124,798, Non Final Office Action dated Jun. 17, 2015", 28 pgs.

(Continued)

*Primary Examiner* — Peter Chau
(74) *Attorney, Agent, or Firm* — Schwegman Lundberg & Woessner, P.A.

(57) ABSTRACT

Embodiments of a user station (STA) and methods for synchronizing with devices in a wireless communication network are generally described herein. In some embodiments, a STA accesses a list of social channels. The STA may transmit a scan message on a primary social channel. The primary social channel may be included in the list of social channels. The STA may determine an identity of the primary social channel by inspecting the list of social channels. The STA may synchronize with a device on the primary social channel when the STA detects transmissions on the primary social channel within a time duration subsequent to transmitting the scan message on the primary social channel. Otherwise, the STA may transmit a scan message on a secondary social channel selected from the list.

3 Claims, 4 Drawing Sheets

Related U.S. Application Data (60) Provisional application No. 61/763,931, filed on Feb. 12, 2013.

(56) References Cited

U.S. PATENT DOCUMENTS

| | | | |
|---|---|---|---|
| 8,892,722 | B1 | 11/2014 | Kopikare et al. |
| 9,282,449 | B2* | 3/2016 | Elhaddad ............... H04W 8/005 |
| 9,295,015 | B2 | 3/2016 | Qi et al. |
| 2006/0165024 | A1 | 7/2006 | Iwami et al. |
| 2006/0251025 | A1 | 11/2006 | Kwon et al. |
| 2009/0080381 | A1 | 3/2009 | Yashar et al. |
| 2009/0252127 | A1 | 10/2009 | Rangarajan et al. |
| 2009/0285165 | A1 | 11/2009 | Berglund et al. |
| 2010/0105332 | A1 | 4/2010 | Mchenry et al. |
| 2010/0303024 | A1 | 12/2010 | Gossain |
| 2011/0161697 | A1 | 6/2011 | Qi et al. |
| 2011/0216747 | A1 | 9/2011 | Shao et al. |
| 2012/0120904 | A1 | 5/2012 | Seok et al. |
| 2012/0134349 | A1 | 5/2012 | Jung et al. |
| 2012/0197988 | A1 | 8/2012 | Leppanen et al. |
| 2013/0034023 | A1 | 2/2013 | Jung |
| 2013/0132501 | A1 | 5/2013 | Vandwalle et al. |
| 2013/0132502 | A1 | 5/2013 | Stacey et al. |
| 2013/0148545 | A1 | 6/2013 | Jung et al. |
| 2013/0148642 | A1 | 6/2013 | Abraham et al. |
| 2013/0148643 | A1 | 6/2013 | Abraham et al. |
| 2013/0185373 | A1 | 7/2013 | Vandwalle et al. |
| 2013/0232253 | A1 | 9/2013 | Elhaddad et al. |
| 2014/0080481 | A1* | 3/2014 | Abraham ............... H04W 8/005 455/434 |
| 2014/0082185 | A1* | 3/2014 | Abraham ............... H04W 24/00 709/224 |
| 2014/0112189 | A1* | 4/2014 | Abraham ............... H04W 4/206 370/254 |
| 2014/0119357 | A1* | 5/2014 | Abraham ............ H04W 56/001 370/338 |
| 2014/0153444 | A1* | 6/2014 | Zhou ..................... H04W 40/12 370/256 |
| 2014/0192793 | A1* | 7/2014 | Abraham .......... H04W 56/0015 370/338 |
| 2014/0198725 | A1* | 7/2014 | Abraham ................ H04L 67/16 370/328 |
| 2014/0211659 | A1* | 7/2014 | Abraham .......... H04W 52/0209 370/254 |
| 2014/0254566 | A1 | 9/2014 | Qi et al. |
| 2015/0245305 | A1* | 8/2015 | Camps Mur .......... H04W 56/00 370/350 |

FOREIGN PATENT DOCUMENTS

| | | |
|---|---|---|
| CN | 101622826 A | 1/2010 |
| CN | 102027795 A | 4/2011 |
| CN | 102783078 A | 11/2012 |
| CN | 105191451 A | 12/2015 |
| TW | 201436620 A | 2/2014 |
| TW | I530217 B | 4/2016 |
| WO | WO-2012174152 A2 | 12/2012 |
| WO | WO-2014126606 A1 | 8/2014 |

OTHER PUBLICATIONS

"U.S. Appl. No. 14/124,798, Notice of Allowance dated Nov. 13, 2015", 17 pgs.

"U.S. Appl. No. 14/124,798, Response filed Sep. 16, 2015 to Non Final Office Action dated Jun. 17, 2015", 9 pgs.

"Chinese Application Serial No. 201380069568.2, Voluntary Amendment filed Apr. 8, 2016", 11 pgs.

"International Application Serial No. PCT/US2013/047966, International Preliminary Report on Patentability dated Aug. 27, 2015", 6 pgs.

"International Application Serial No. PCT/US2013/047966, International Search Report dated Nov. 14, 2013", 4 pgs.

"International Application Serial No. PCT/US2013/047966, Written Opinion dated Nov. 14, 2013", 4 pgs.

"Taiwanese Application Serial No. 103104430, Office Action dated May 28, 2015", w/ English Translation, 24 pgs.

"Taiwanese Application Serial No. 103104430, Response filed Nov. 27, 2015 to Office Action dated May 28, 2015", (English Translation of Claims), 59 pgs.

"Wi-Fi Peer-to-Peer (P2P) Technical Specification Version 1.2", Wi-Fi Alliance Technical Committee P2P Task Group, (2010), 159 pgs.

"Chinese Application Serial No. 201380069568.2, Office Action dated Jul. 22, 2016", English Translated, 6 pgs.

"Chinese Application Serial No. 201380069568.2, Response filed Dec. 6, 2016 to Office Action dated Jul. 22, 2016", w/ Claims in English, 17 pgs.

"European Application Serial No. 13874970.0, Extended European Search Report dated Sep. 6, 2016", 8 pgs.

"European Application Serial No. 13874970.0, Response Filed Mar. 31, 2017 to Extended European Search Report dated Sep. 6, 2016", 13 pgs.

* cited by examiner

METHODS, WIRELESS COMMUNICATION STATIONS, AND SYSTEM FOR SYNCHRONIZING DEVICES AND NEIGHBOR AREA NETWORKING (NAN) CONFIGURATION

CROSS-REFERENCE TO RELATED APPLICATIONS

This application is a continuation of U.S. patent application Ser. No. 14/124,798, filed Dec. 9, 2013, which is a U.S. National Stage Filing under 35 U.S.C. 371 from International Patent Application Serial No. PCT/US2013/047966, filed Jun. 26, 2013, which claims priority to U.S. Provisional Patent Application No. 61/763,931, filed on Feb. 12, 2013, the content of which applications is incorporated herein by reference in their entirety.

TECHNICAL FIELD

Embodiments pertain to communication networks. Some embodiments pertain to Neighbor Awareness Networking (NAN) in accordance with Institute of Electrical and Electronics Engineers (IEEE) 802.11 family of standards.

BACKGROUND

Recently, there has been an upsurge in the use of residential Institute of Electrical and Electronics Engineers (IEEE) 802.11 wireless networks to provide a distribution medium between homes in a neighborhood. This wireless connectivity may be provided over so-called social channels, defined by Wi-Fi Direct. User devices may scan the social channels to discover other user devices or wireless access points (APs) with which to synchronize.

User devices may use a large amount of power or time in scanning if several social channels must be scanned. Accordingly, there is a general need to define a primary social channel that user devices scan first, and on which a user device may initialize a neighbor awareness network (NAN) if the user device scan discovers that there are no APs or NANs already operating on the social channels.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
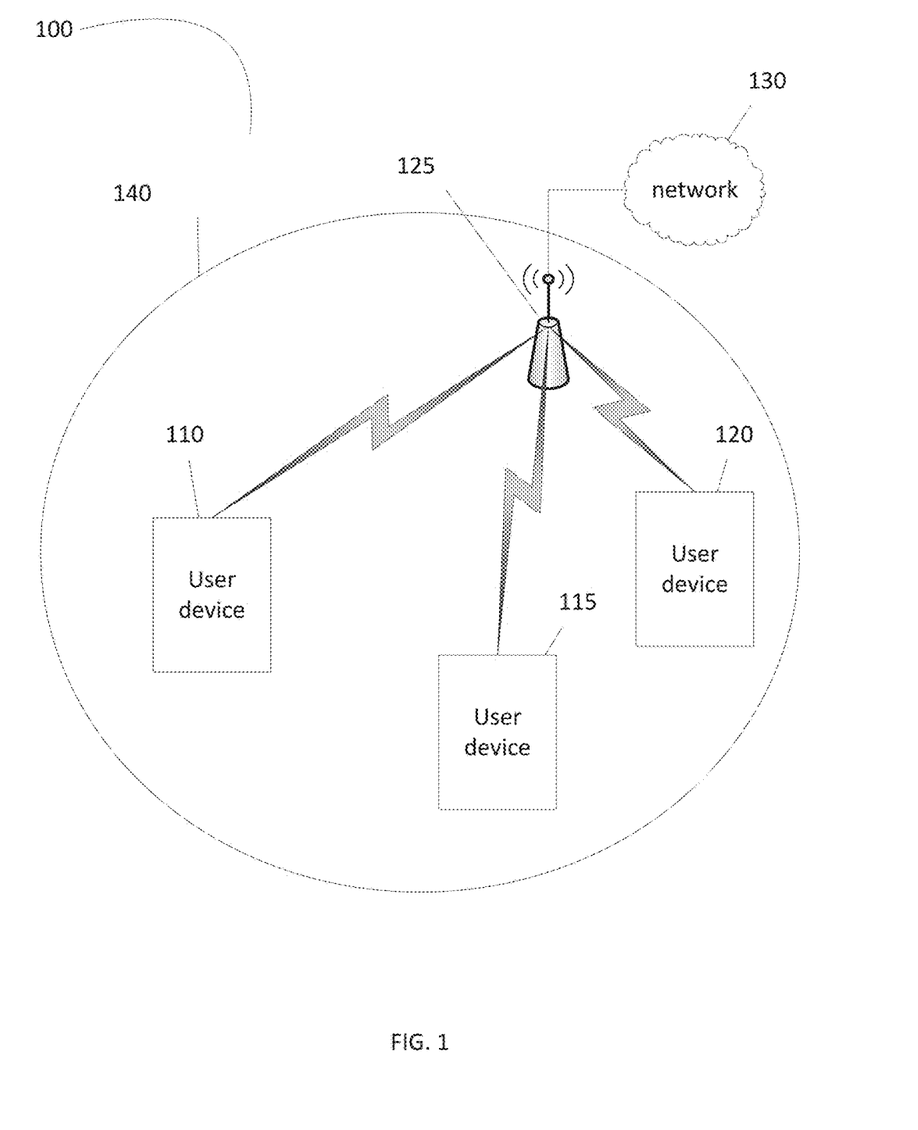
FIG. 1 illustrates a wireless domain in which example embodiments are implemented.

FIG. 1 illustrates a system 100 in which example embodiments may be implemented. The system 100 includes user wireless communication stations (STAs) 110, 115 and 120. The user STAs 110, 115 and 120 may be, for example, laptop computers, smart phones, tablet computers, printers, machine-type devices such as smart meters, or any other wireless device with or without a user interface. In an example, the user STAs 110, 115 and 120 have a wireless connection through a STA 125 to the network 130. The network 130 may represent an interconnection of a number of networks. For instance, the network 130 may couple with a wide area network such as the Internet or an intranet.

The STA 125 may be a more stationary communication unit such as a wireless access point (AP) and will hereinafter be referred to as the AP 125. The user STAs 110, 115 and 120 may be within a range or service area 140 of the AP 125. In some embodiments, the user STAs 110, 115 and 120 and the AP 125 may transmit and/or receive communications in accordance with specific communication standards, such as the IEEE 802.11 standards although user STAs 110, 115 and 120 and the AP 125 may also be suitable to transmit and/or receive communications in accordance with other techniques.

The user STAs 110, 115 and 120, and the AP 125, may be located within a home or a residential neighborhood. Residential IEEE 802.11 networks may have higher capacity than broadband connections, providing an alternative, fast distribution medium between homes in a neighborhood. The user STAs 110, 115 and 120 may use residential IEEE 802.11 networks to implement services that are "neighborhood-aware," in accordance with Neighbor Awareness Networking (NAN) specifications and standards.

The user STAs 110, 115 and 120 may use social channels, defined in Wi-Fi Direct specifications, for NAN connectivity. Currently, Wi-Fi Direct defines three social channels: Channels 1, 6, and 11 of the 2.4 GHz band. While increasing the number of social channels may provide flexibility and reliability for device discovery and for synchronization of networks in which NAN operates, increasing the number of social channels may result in higher power consumption and longer discovery time for user STAs 110, 115 and 120 to find each other.

Example embodiments may reduce this power consumption and discovery tune by implementing a scanning procedure that defines a primary social channel and a secondary social channel. However, example embodiments are not limited to a primary and a secondary social channel, and may include three or more social channels. The primary social channel may be a channel where NAN primarily operates. The secondary social channel may be a channel where NAN operates if the primary social channel is not available. For example, the primary social channel may not be available due to interference or high traffic conditions.

Figure 2:
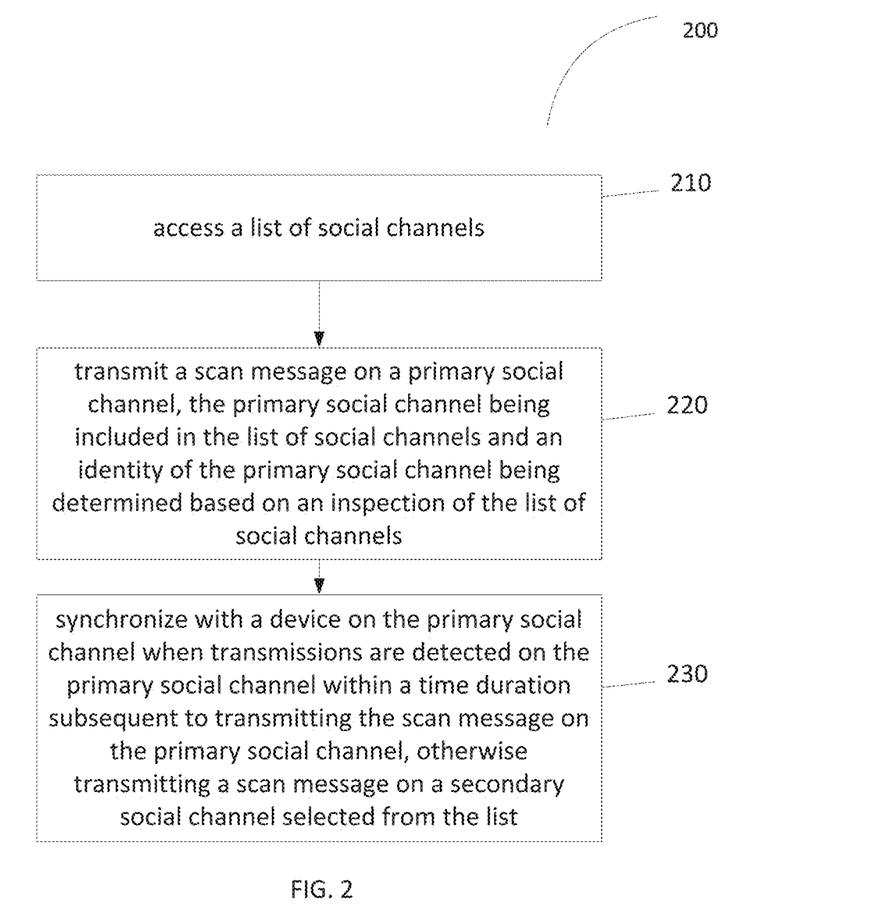
FIG. 2 is a flow diagram of a procedure performed by a user station (STA) for synchronizing with devices in a wireless communication network, in accordance with some embodiments.

FIG. 2 illustrates a method 200, performed by the user STA 110, for synchronizing with devices in a wireless network, for example a NAN.

Referring to FIG. 2, in operation 210, the user STA 110 may access a of social channels. The social channels may be Wi-Fi Peer-to-Peer (P2P) channels defined in Wi-Fi Direct specifications.

In operation 220, the user STA 110 may transmit a scan message on a primary social channel. The primary social channel may be included in the list of social channels. The user STA 110 may determine the identity of the primary social channel based on an inspection of the list of social channels. The list of social channels may have an order defined in accordance with a standard of the Wi-Fi Alliance family of standards such that the primary social channel is previous in the order to a secondary social channel. The scan message may be a Probe Request frame configured in accordance with a standard of the Institute of Electrical and Electronics Engineers (IEEE) 802.11 family standards. The scan message may allow the user STA 110 to actively scan the primary social channel.

In operation 230, the user STA 110 may synchronize with a device on the primary social channel when the user STA detects a transmission on the primary social channel.

Synchronizing with devices may comprise synchronizing with an access point (AP) responsive to receiving a probe response beacon from the AP on the primary social channel. The user STA 110 may prefer synchronization with an AP and therefore if an AP responds to the active scan the user STA 110 may synchronize with that AP on the primary social channel and discontinue scanning for other types of devices on the primary social channel. Power and time requirements may be further be reduced by the user STA 110 performing an active scan, rather than passively listening over one or more social channels.

The user STA 110 may use a time stamp function (TSF) of the AP to synchronize with the AP. For example, the probe response beacon may include TSF information comprising a synchronization point at which the user STA 110 may synchronize with the AP. If the user STA 110 receives two or more probe response beacons from two or more APs, the user STA 110 may synchronize with the AP that has the next available synchronization point, based on the TSF information in each of the two or more probe response beacons.

If no AP responds on the primary social channel then the user STA 110 may scan for NAN synchronization transmissions on the primary social channel. If the user STA 110 detects NAN synchronization transmissions on the primary social channel, the user STA may synchronize with the detected NAN. For example, the NAN synchronization transmissions may include TSF information comprising a synchronization point at which the user STA 110 may synchronize with the NAN. If the user STA 110 detects two or more NAN synchronization transmissions, the user STA 110 may select the NAN for synchronizing based on TSFs of the two more NAN synchronization transmissions.

The user STA 110 may wait for a time duration to receive transmissions on the primary social channel. The time duration for listening for transmissions on the primary social channel may be based on a predicted time for receiving responses to the Probe Request frame. The time duration may be, for example 20 milliseconds.

If the user STA 110 does not detect AP probe response frames or NAN synchronization transmissions on the primary social channel, the user STA 110 may repeat the scanning process, described above, on a secondary social channel. If the user STA 110 does not detect either AP or NAN synchronization transmissions on the secondary social channel, the user STA 110 may configure a NAN by transmitting a NAN synchronization frame on the primary social channel if channel conditions on the primary social channel meet a threshold. Otherwise, the user STA 110 may configure a NAN by transmitting a NAN synchronization frame on the secondary social channel.

Figure 3:
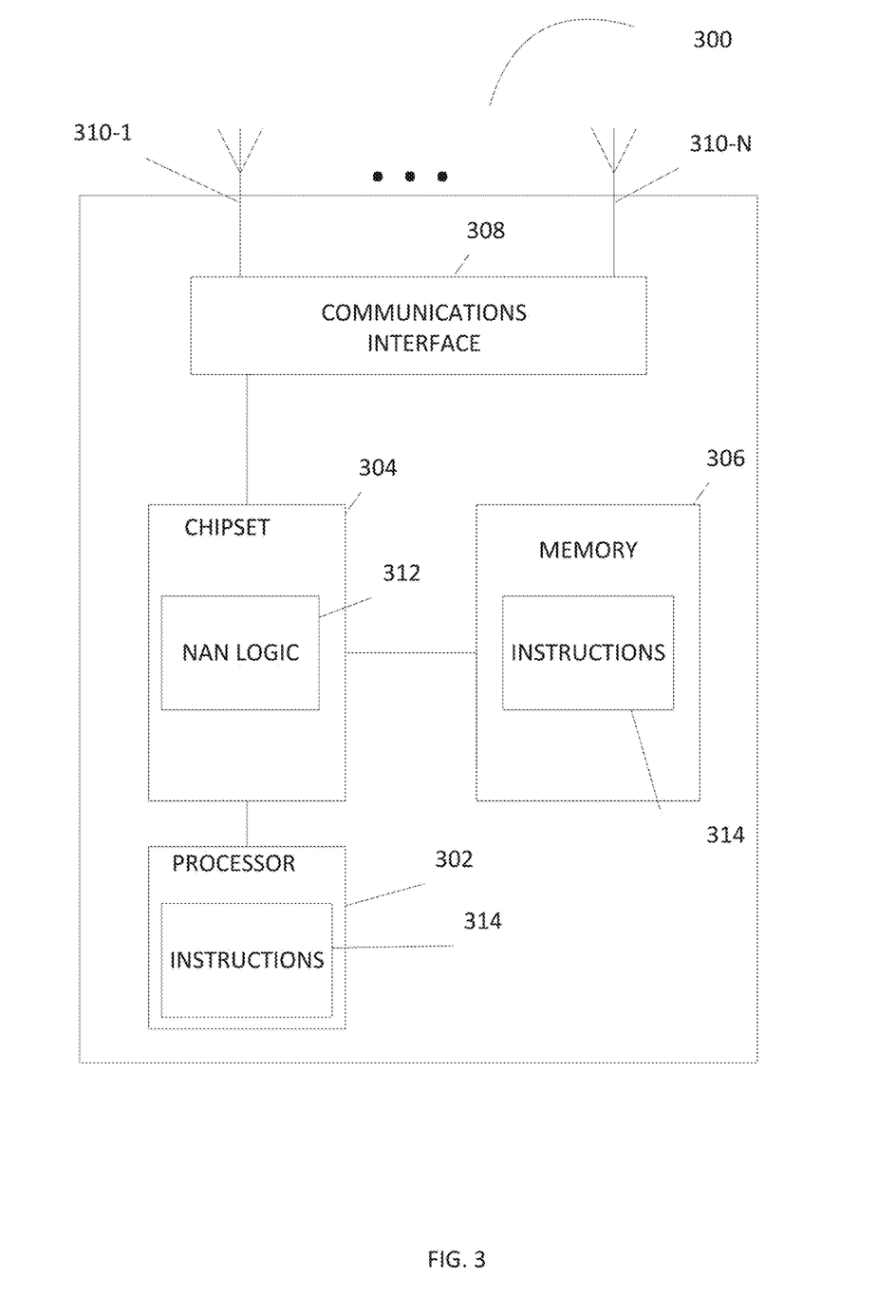
FIG. 3 illustrates a functional block diagram of a communication station (STA), in accordance with some embodiments.

FIG. 3 illustrates a functional block diagram of a STA 300, in accordance with some embodiments. The STA 300 may be suitable as a user STA 110, 115, or 120 (FIG. 1). The STA 300 may support methods for operating in a wireless communication network, in accordance with embodiments. The STA 300 may include a processor 302, which uses a chipset 304 to access on-chip state memory 306, as well as a communications interface 308. In one embodiment the memory 306 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

In at least one embodiment, the communications interface 308 is, for example, a wireless Physical Layer (PHY), which operates according to a multiple input/multiple output (MIMO) operation. The communications interface 308 may transmit a scan message on a primary social channel. The primary social channel may be included in an ordered list of social channels. The ordered list of social channels may be stored in the memory 306. The order of the ordered list may be defined in accordance with a standard of the Wi-Fi Alliance family of standards. The social channels may be Wi-Fi Peer-to-Peer (P2P) channels. The scan message may be a Probe Request frame configured in accordance with a standard of the Institute of Electrical and Electronics Engineers (IEEE) 802.11 family standards.

The chipset 304 may incorporate therein NAN Logic 312 to, for example, configure or synchronize to a NAN. In an embodiment, the chipset 304 provides MAC layer functionality. The chipset 304 may configure the scan message for actively scanning a social channel. The chipset 304 may be a single chip. While logic is described with reference to chipset 304, the chipset 304 may employ one or more processors executing instructions (e.g., software) stored in a tangible medium.

Embodiments may be implemented in one or a combination of hardware, firmware and software. Embodiments may also be implemented as instructions 314 stored on a non-transitory computer-readable storage device, which may be read and executed by at least one processor 302 to perform the operations described herein.

The processor 302 may be arranged to determine an identity of the primary social channel and the secondary social channel based on an inspection of the list of social channels. The processor 302 may be arranged to synchronize with a device on the primary social channel when the processor 302 detects a transmission on the primary social channel within a time duration subsequent to transmitting the scan message on the primary social channel. Otherwise, the processor may cause the communications interface 308 to transmit a scan message on a secondary social channel selected from the list of social channels. The processor 302 may be arranged to determine the time duration for listening for transmissions on the primary social channel based on a predicted time for receiving a response to the Probe Request frame.

The processor 302 may be arranged to synchronize with an access point (AP) on the primary social channel if a probe response beacon is received, from the AP, on the primary social channel. If more than one probe response beacon is received on the primary social channel, the processor 302 may be arranged to select the AP with which to synchronize based on the time stamps within each of the received probe response beacons, as described above with respect to FIG. 2.

The processor 302 may be arranged to synchronize with a Neighbor Awareness Network (NAN) on the primary social channel if a probe response beacon is not received on the primary social channel within the time duration and a NAN synchronization transmission is received on the primary social channel.

In some embodiments, the instructions 314 are stored on the processor 302 or the memory 306 such that the processor 302 and the memory 306 act as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The instructions 314, when executed on the STA 300, may cause the STA 300 to access a list of social channels. The list may be stored in the memory 306. The social channels may be Wi-Fi Peer-to-Peer (P2P) channels. The instructions 314, when executed on the STA 300, may cause the STA 300 transmit a scan message on a primary social channel. The primary social channel may be included in the list of social channels. The STA 300 may determine an identity of the primary social channel based on an inspection of the list of social channels. The instructions 314, when executed on the STA 300, may cause the STA 300 to synchronize with a device on the primary social channel when the STA 300 detects a transmission on the primary social channel within a time duration subsequent to transmitting the scan message on the primary social channel. If the STA 300 detects no transmission on the primary social channel within the time duration, the STA 300 may transmit a scan message on a secondary social channel selected from the list.

Although the STA 300 is illustrated as having several separate functional elements, one or more of the functional elements may be combined and may be implemented by combinations of software-configured elements, such as processing elements including digital signal processors (DSPs) and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements of the STA 300 may refer to one or more processes operating on one or more processing elements.

The STA 300 may include multiple transmit and receive antennas 310-1 through 310-N, where N is a natural number. Antennas 310-1 through 310-N may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 310-1 through 310-N may be effectively separated to take advantage of spatial diversity and the different channel characteristics that may result between each of antennas 310-1 through 310-N. In some MIMO embodiments, antennas 310-1 through 310-N may be separated by up to 1/10 of a wavelength or more.

Figure 4:
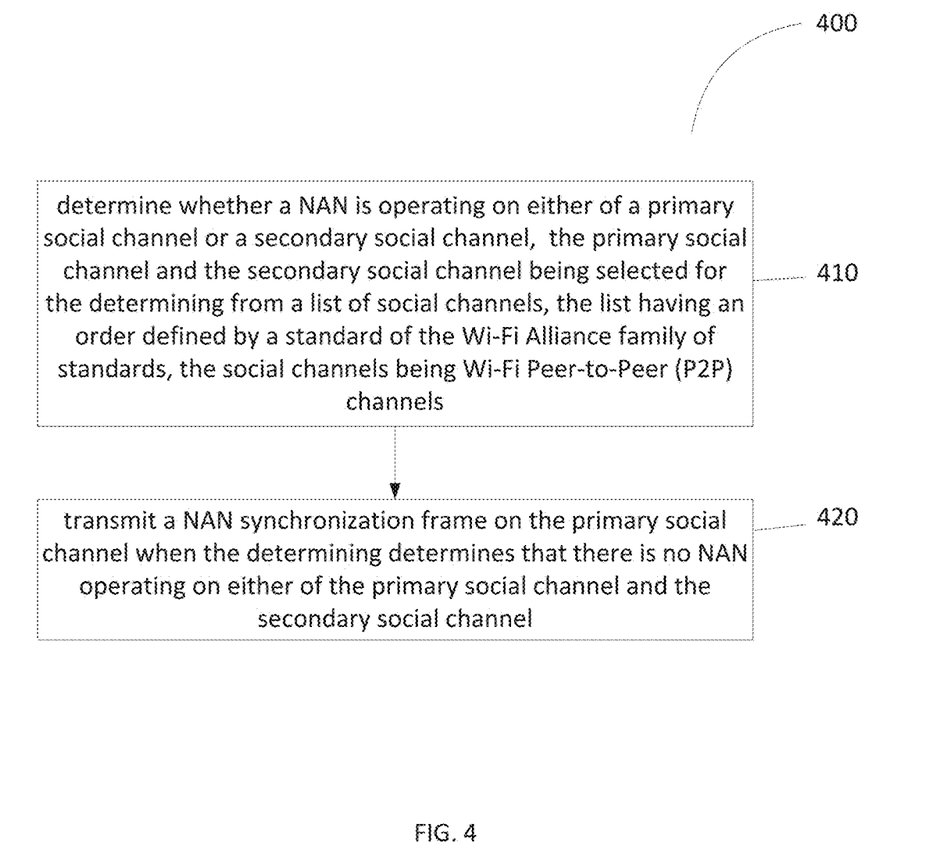
FIG. 4 is a flow diagram of a procedure for initializing a neighbor awareness network in accordance with some embodiments.

FIG. 4 illustrates a method 400, performed by the user STA 110, for reducing device-to-device broadcast failures in a wireless communication network. In operation 410, the user STA 110 may determine whether a NAN is operating on either of a primary social channel or a secondary social channel. The user STA 110 may select the primary social channel and the secondary social channel for the determining from a list of social channels as described above with respect to FIG. 2. The list may have an order defined by a standard of the Wi-Fi Alliance family of standards. The social channels may be Wi-Fi Peer-to-Peer (P2P) channels.

In operation 420, the user STA 110 may transmit a NAN synchronization frame on the primary social channel if there is no NAN operating on either the primary social channel or the secondary social channel. The user STA 110 may transmit the NAN synchronization frame on the primary social channel if a channel condition on the primary social channel meets a threshold channel condition.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method, performed by a user station (STA), for initializing a neighbor awareness network (NAN), the method comprising:

determining whether a NAN is operating on either of a primary social channel or a secondary social channel, the primary social channel and the secondary social channel being selected for the determining from a list of social channels, the list having an order defined by a standard of Wi-Fi Alliance family of standards, the social channels of the list being Wi-Fi Peer-to-Peer (P2P) channels; and transmitting a NAN synchronization frame on the primary social channel in response to determining that there is no NAN operating on either of the primary social channel and the secondary social channel and in response to determining that a channel condition on the primary social channel meets a threshold channel condition.

2. An apparatus comprising:

memory;

processing circuitry configured to:

determine whether a neighbor awareness network (NAN) is operating on either of a primary social channel or a secondary social channel, the primary social channel and the secondary social channel being selected for the determining from a list of social channels, the list having an order defined by a standard of Wi-Fi Alliance family of standards, the social channels of the list being Wi-Fi Peer-to-Peer (P2P) channels; and physical layer (PHY) circuitry configured to:

transmit a NAN synchronization frame on the primary social channel in response to determining that there is no NAN operating on either of the primary social channel and the secondary social channel and in response to determining that a channel condition on the primary social channel meets a threshold channel condition.

3. A non-transitory computer-readable storage medium that stores instructions for execution by one or more processors of a wireless device to perform operations comprising:

determining whether a neighbor awareness network (NAN) is operating on either of a primary social channel or a secondary social channel, the primary social channel and the secondary social channel being selected for the determining from a list of social channels, the list having an order defined by a standard of Wi-Fi Alliance family of standards, the social channels of the list being Wi-Fi Peer-to-Peer (P2P) channels; and transmitting a NAN synchronization frame on the primary social channel in response to determining that there is no NAN operating on either of the primary social channel and the secondary social channel and in response to determining that a channel condition on the primary social channel meets a threshold channel condition.

\* \* \* \* \*

UNITED STATES PATENT AND TRADEMARK OFFICE
CERTIFICATE OF CORRECTION

PATENT NO. : 9,907,037 B2  
APPLICATION NO. : 15/076494  
DATED : February 27, 2018  
INVENTOR(S) : Qi et al.

Page 1 of 1

It is certified that error appears in the above-identified patent and that said Letters Patent is hereby corrected as shown below:

On the Title Page

In item (62), in "Related U.S. Application Data", in Column 1, Line 1, delete "(62) Division" and insert --(63) Continuation-- therefor Signed and Sealed this  
Fourteenth Day of April, 2020

Andrei Iancu  
*Director of the United States Patent and Trademark Office*